(12) United States Patent
Denifl et al.

(10) Patent No.: US 8,399,374 B2
(45) Date of Patent: Mar. 19, 2013

(54) CATALYST PARTICLES

(75) Inventors: Peter Denifl, Brenner (AT); Timo Leinonen, Tolkkinen (FI)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 12/087,297

(22) PCT Filed: Dec. 29, 2006

(86) PCT No.: PCT/EP2006/012631
§ 371 (c)(1),
(2), (4) Date: Jul. 31, 2008

(87) PCT Pub. No.: WO2007/077027
PCT Pub. Date: Jul. 12, 2007

(65) Prior Publication Data
US 2009/0171042 A1    Jul. 2, 2009

(30) Foreign Application Priority Data
Dec. 30, 2005    (EP) .................................... 05028744

(51) Int. Cl.
*B01J 31/06*    (2006.01)
*C08F 4/50*    (2006.01)

(52) U.S. Cl. ...... 502/104; 502/159; 502/171; 526/123.1

(58) Field of Classification Search ............... 526/123.1; 502/104, 159, 171
See application file for complete search history.

(56) References Cited

U.S. PATENT DOCUMENTS

| | | | | |
|---|---|---|---|---|
| 6,013,742 A | * | 1/2000 | Huffer et al. | 526/124.5 |
| 6,277,778 B1 | | 8/2001 | Leino et al. | |
| 6,329,315 B1 | * | 12/2001 | Denton et al. | 502/232 |
| 7,465,775 B2 | * | 12/2008 | Vestberg et al. | 526/348 |

FOREIGN PATENT DOCUMENTS

| | | |
|---|---|---|
| EP | 01/29368 | 12/1984 |
| EP | 02/60130 | 3/1988 |
| EP | 04/23101 | 4/1991 |
| EP | 05/37130 | 4/1993 |
| JP | 05/163023 | 6/1993 |
| WO | WO-94/28034 | 12/1994 |
| WO | WO-96/13529 | 5/1996 |
| WO | WO-97/10248 | 3/1997 |
| WO | WO-97/28170 | 8/1997 |
| WO | WO-98/46616 | 10/1998 |
| WO | WO-98/49208 | 11/1998 |
| WO | WO-98/56831 | 12/1998 |
| WO | WO-99/10353 | 3/1999 |
| WO | WO-99/12981 | 3/1999 |
| WO | WO-99/19335 | 4/1999 |
| WO | WO-99/41290 | 8/1999 |
| WO | WO-00/34341 | 6/2000 |
| WO | WO-01/70395 | 9/2001 |
| WO | WO-02/060963 | 8/2002 |
| WO | WO-03/000754 | 1/2003 |
| WO | WO-03/000757 | 1/2003 |
| WO | WO-03/051934 | 6/2003 |
| WO | WO-2004/089542 | 10/2004 |
| WO | WO-2004/111098 | 12/2004 |
| WO | WO-2006/069733 | 7/2006 |

* cited by examiner

*Primary Examiner* — Robert D. Harlan
(74) *Attorney, Agent, or Firm* — Jordan and Hamburg LLP

(57) ABSTRACT

The present invention relates to novel and unique catalyst particles, a method for preparing same, the use of the catalyst particles for polymerization reactions and methods of controlling the catalyst particle morphology.

17 Claims, 2 Drawing Sheets

CATALYST PARTICLES

BACKGROUND OF THE INVENTION

The present invention relates to novel and unique catalyst systems comprising catalyst particles, a method for preparing same, the use of the catalyst particles for polymerization reactions and methods of controlling the catalyst particle morphology.

Catalyst systems comprise catalysts, which include one or more catalyst components and optionally cocatalysts, external donors and poison scavengers or any other catalyst additives. Catalysts which are solutions of one or more catalyst components are known in the field as homogeneous catalysts. Typically, homogeneous catalysts and catalyst systems are used as liquids in the polymerization process. Such systems have in general a satisfactory catalytic activity, but their problem has been that the polymer thus produced has a poor morphology. As a consequence, operation of slurry and gas reactors using a homogeneous catalyst system caused problems in practice, since for example fouling of the reactor can occur.

Various approaches have been attempted in order to overcome this drawback. Homogeneous catalysts, for example, have been subjected to prepolymerization in order to introduce the catalysts or catalyst systems in the form of prepolymerized polymer particles comprising catalytically active sites into polymerisation reactions. Other attempts have been made in order to support the homogeneous catalyst on carrier materials, such as solution impregnation methods on porous organic and inorganic support materials, such as silica, $MgCl_2$, or porous polymeric materials. Such kinds of heterogeneous supported catalyst systems are widely used e.g. in the field of olefin polymerisations.

The international present application WO 2004/089542, for example, discloses the use of porous functionalized beads of polystyrene in order to immobilize an iron based polymerization catalyst.

However, also supported catalysts present drawbacks. It is often difficult to get an even distribution of the catalyst components within the porous carrier material. Furthermore, it is possible that the catalyst components are leached from the support, so that overall unsatisfactory polymerization behavior of the catalyst occurs. Carrier materials furthermore can also have adverse effects on the activity of the catalyst, the polymerization behavior and the properties of the polymeric product.

Accordingly, there exists the need in the art to provide alternative and improved ways of employing heterogeneous catalysts and catalyst systems for polymerization reactions which do not suffer from the drawbacks as identified above.

SUMMARY OF THE INVENTION

The present invention accordingly attempts to provide novel means of employing heterogeneous catalysts and catalyst systems for polymerization reactions. The present invention aims at providing novel catalysts as well as methods of preparing same.

Accordingly, the present invention solves the above-outlined objects by providing novel catalyst particles. The present invention furthermore provides a method of preparing said catalyst particles. The present invention also provides the use of the novel catalyst particles for polymerization reactions. Finally, the present invention provides a method for controlling the catalyst particle morphology.

Further embodiments of the present invention are set forth in the following specification. The examples as contained herein are considered as being illustrative and should not be construed in a limiting way.

DETAILED DESCRIPTION OF THE INVENTION

Figure 1:
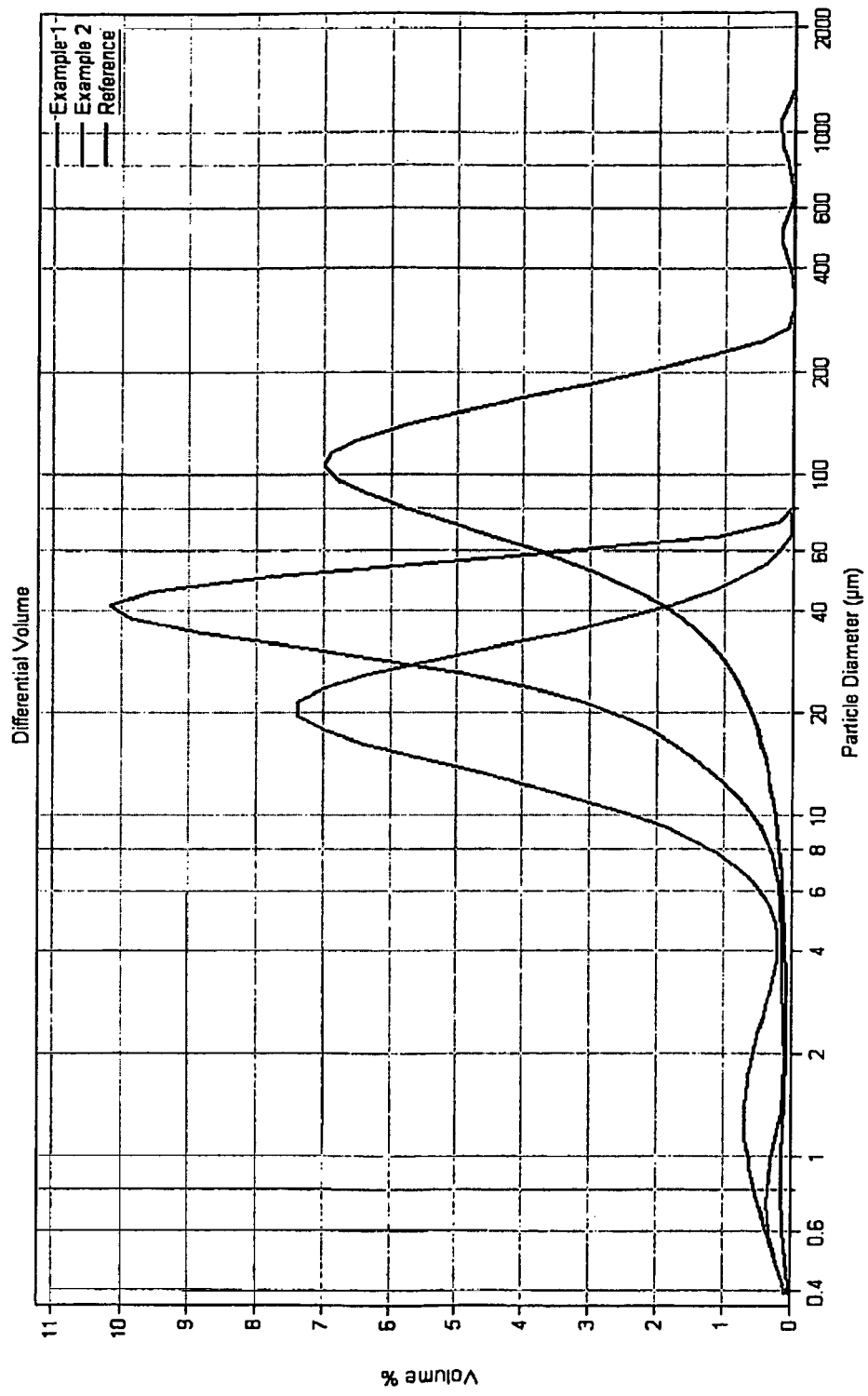
FIG. 1 shows particle size distributions for two examples of catalyst particles in accordance with the present invention, compared with one reference example.
Figure 2:
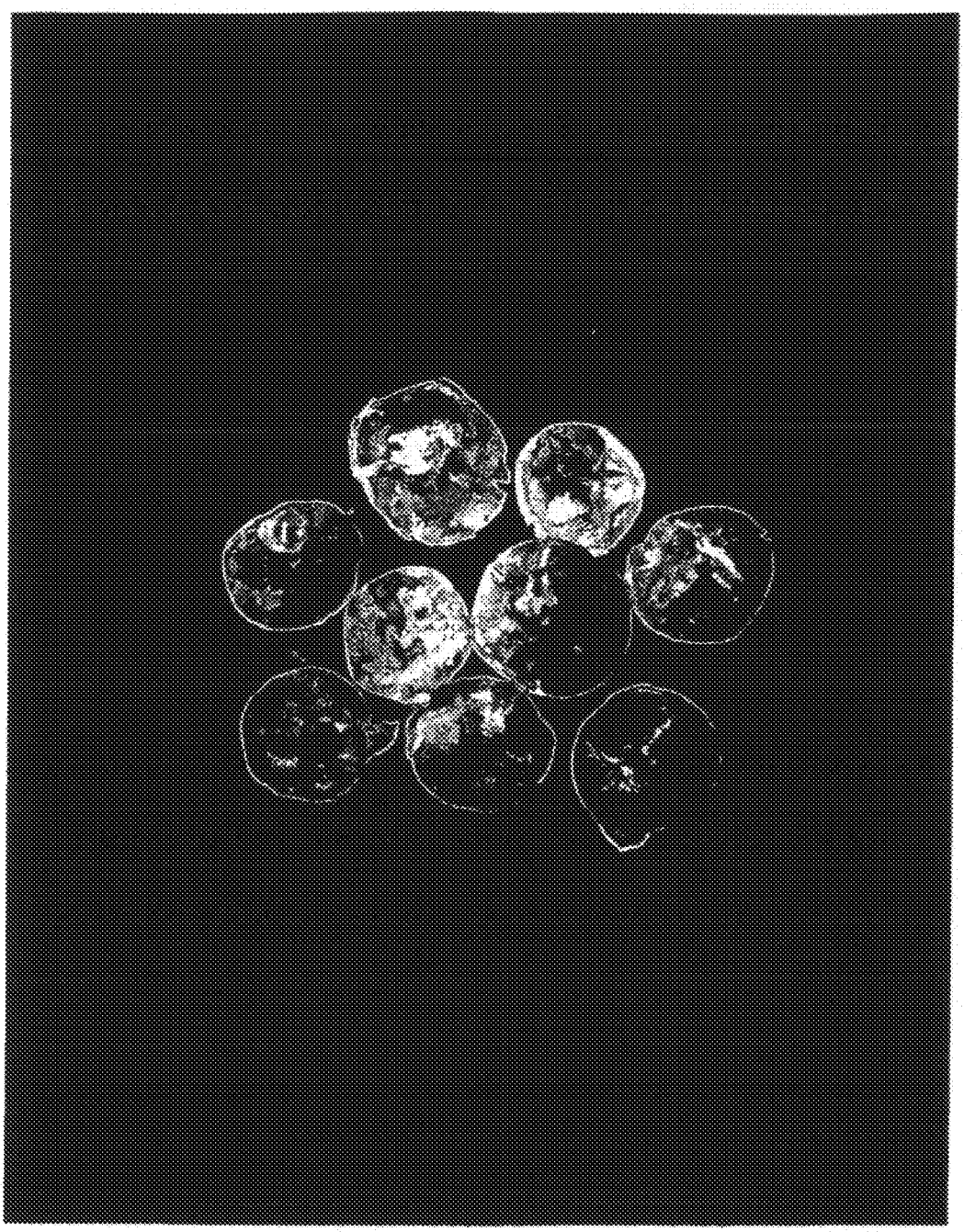
FIG. 2 shows a picture of polypropylene particles produced with the catalyst particles in accordance with the present invention.

The present invention provides a catalyst system comprising a catalyst in the form of solid particles. Catalyst particles may comprise one or more catalyst components. These particles are typically of spherical shape, although the present invention is not limited to a spherical shape. The solid particles in accordance with the present invention also may be present in round but not spherical shapes, such as elongated particles, or they may be of irregular size. Preferred in accordance with the present invention, however, are particles having a spherical shape.

The solid particles in accordance with the present invention furthermore show a predetermined particle size, depending in particular from the intended end use (type of polymerization process and polymer product desired to be obtained). Typically, the solid particles in accordance with the present invention show uniform morphology and in particular a narrow particle size distribution. Broad particle size distributions as well as multimodal particle size distributions are, however, also envisaged by the present invention. Typically and preferred, however, the solid particles in accordance with the present invention show uniform particles and a narrow particle size distribution.

The solid catalyst particles in accordance with the present invention typically have an average size range of from 1 to 500 pm, for example 5 to 500 pm. Preferred embodiments of the present invention are solid particles having an average size range of from 5 to 200 pm or from 10 to 150 pm. Smaller average size ranges, however, can also be obtained in accordance with the present invention, such as from 5 to 100 pm. Alternative embodiments are larger average particle size ranges, for example from 20 to 250 pm. These average size ranges of the solid particles in accordance with the present invention may be obtained as explained further below in connection with the method of preparing the solid particles.

With respect to the particle sizes and the particle size distribution, the present invention furthermore also envisages that desired particle size fractions can be isolated, for example by sieving processes, and that mixtures of solid particles of different average size range or different particle size distributions may be prepared in order to obtain solid particle compositions having a tailored particle size distribution, average size range etc.

The solid catalyst particles in accordance with the present invention furthermore are characterized in that they show from rather low to very low surface area determined with the commonly known BET method with $N_2$ gas as analysis adsorptive. Typically, the solid catalyst particles have a surface area of 20 $m^2/g$ or less, preferably 10 $m^2/g$ or less. In some embodiments, the solid catalyst particles in accordance with the present invention show a surface area of below the threshold value of standard test equipment for the determination of surface area using the BET method as above, i.e. the solid catalyst particles in accordance with the present invention may have a surface area of 5 m²/g or less.

The solid catalyst particles in accordance with the present invention are furthermore characterized in that the catalytically active sites are distributed throughout the catalyst matrix of the particles. In accordance with the present invention, any type of catalyst may be employed, in particular polymerization catalysts, preferably polymerization catalysts suitable for the polymerization of olefins. Typical examples thereof, usually comprising as catalyst components transition metal compounds, which are illustrative embodiments of the present invention, are single site catalyst, such as metallocene or non-metallocene singe site catalysts, as well as Ziegler-Natta catalysts, including in particular systems based on titanium and magnesium. Suitable examples are discussed further in the following and are also disclosed in the international applications WO 03/051934, WO 03/000754 and WO 03/000757. These documents are incorporated herein by reference with respect to the suitable catalysts and catalyst systems to be employed in accordance with the present invention.

Particularly suitable catalyst components are shown in the following:

Catalyst Components

The term "catalyst component" as used herein may include, in addition to the transition metal compound (see below), also any cocatalyst(s), additional transition metal compounds and/or activators and/or poison scavengers, and/or any reaction product(s) of a transition compound(s) and a cocatalyst(s). Thus the catalyst may be formed in situ from the catalyst components, for example in solution in a manner known in the art.

It should also be understood that the catalyst prepared according to the invention may be used as such in a polymerisation process or be further activated with additional cocatalysts or activators to form the active catalyst system, which further may comprise e.g. external donors etc. Furthermore, said catalyst of the invention may be part of a further catalyst system. These alternatives are within the knowledge of a skilled person.

Single Site Catalysts

The catalyst comprises, as outlined above a transition metal compound. Suitable compounds are in particular organometallic compounds. The term "an organometallic compound of a transition metal" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers e.g. compounds of metals from Group 3 to 10, e.g. Group 3 to 7, or 3 to 6, such as Group 4 to 6 of the Periodic Table, (IUPAC, Nomenclature of Inorganic Chemistry, 1989), as well as lanthanides or actinides.

Accordingly, said organotransition metal compound may have the following formula I:

wherein M is a transition metal as defined above and each X is independently a monovalent anionic ligand, such as a sigma-ligand, each L is independently an organic ligand which coordinates to M, R is a bridging group linking two ligands L, m is 1, 2 or 3, n is 0, 1 or 2, preferably 0 or 1, q is 1, 2 or 3, and m+q is equal to the valency of the metal.

In a more preferred definition, each L is independently (a) a substituted or unsubstituted cyclopentadiene or a mono-, bi- or multifused derivative of a cyclopentadiene which optionally bear further substituents and/or one or more hetero ring atoms from a Group 13 to 16 of the Periodic Table (IUPAC); or (b) an acyclic. rt'- to n⁴- or n⁶-ligand composed of atoms from Groups 13 to 16 of the Periodic Table, and in which the open chain ligand may be fused with one or two, preferably two, aromatic or non-aromatic rings and/or bear further substituents; or (c) a cyclic sigma-, n'- to n⁴- or n⁶, mono-, bior multidentate ligand composed of unsubstituted or substituted mono-, bi- or multicyclic ring systems selected from aromatic or non-aromatic or partially saturated ring systems, and containing carbon ring atoms and optionally one or more heteroatoms selected from Groups 15 and 16 of the Periodic Table.

By "sigma-ligand" is meant a group bonded to the metal at one or more places via a sigma bond.

According to a preferred embodiment said organotransition metal compound (I) is a group of compounds known as metallocenes. Said metallocenes bear at least one organic ligand, generally 1, 2 or 3, e.g. 1 or 2, which is n-bonded to the metal, e.g. a q 2-⁶-ligand, such as a q⁵-ligand. Preferably, a metallocene is a Group 4 to 6 transition metal, suitably titanocene, zirconocene or hafnocene, which contains at least one n₅ ligand, which is e.g. an optionally substituted cyclopentadienyl, an optionally substituted indenyl, an optionally substituted tetrahydroindenyl or an optionally substituted fluorenyl.

The metallocene compound may have a formula II:

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"3, —OSiR", —SR", —PR"2 or —NR"2, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"2, the two substituents R" can form a ring, e.g. five- or six-membered ring, together with the nitrogen atom wherein they are attached to;

R is a bridge of 1-7 atoms, e.g. a bridge of 1-4 C-atoms and 0-4 heteroatoms, wherein the heteroatoro(s) can be e.g. Si, Ge and/or O atom(s), whereby each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR¹₂, wherein each R' is independently C1-C20-alkyl, C6-C20-aryl or tri(C1-C20-alkyl)silyl-residue, such as trimethylsilyl-;

M is a transition metal of Group 4 to 6, such as Group 4, e.g. Ti, Zr or Hf, each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"3. —SiR"3, —OsiR"₃ or —NR"₂; each R" is independently hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom wherein they are attached to;

and each of the above mentioned ring moiety alone or as a part of a moiety as the substituent for Cp, X, R" or R can further be substituted e.g. with C1-C20-alkyl which may contain Si and/or 0 atoms;

n is 0, 1 or 2, e.g. 0 or 1, m is 1, 2 or 3, e.g. 1 or 2, q is 1, 2 or 3, e.g. 2 or 3, wherein m+q is equal to the valency of M.

Said metallocenes 11 and their preparation are well known in the art.

Cp is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula II, each Cp independently bears one or more substituents selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl; X is H, halogen, C1-C20-alkyl, C1-C20-alkoxy, C6-C20-aryl, C7-C20-arylalkenyl or —NR"$_2$ as defined above, e.g. —N(C1-C20-alkyl)$_2$; R is a methylene, ethylene or a silyl bridge, whereby the silyl can be substituted as defined above, e.g. a dimethylsilyl=, methylphenylsilyl= or trimethylsilylmethylsilyl=bridge; n is 0 or 1; m is 2 and q is two.

Preferably, R" is other than hydrogen.

A specific subgroup includes the well known metallocenes of Zr, Hf and Ti with one or two, e.g. two, n-ligands which may be bridged or unbridged cyclopentadienyl ligands optionally substituted with e.g. siloxy, alkyl and/or aryl as defined above, or with two unbridged or bridged indenyl ligands optionally substituted in any of the ring moieties with e.g. siloxy, alkyl and/or aryl as defined above, e.g. at 2-, 3-, 4- and/or 7-positions. As specific examples e.g. b is (alkylcyclopentadienyl)Zr (or Ti or Hf) dihalogenides can be mentioned, such as bis(n-butylcyclopentadienyl)ZrCl$_2$ and bis(nbutylcyclopentadienyl)HfCl$_2$, see e.g. EP-A-129 368. Examples of compounds wherein the metal atom b ears a —NR"$_2$ ligand are disclosed i.a. in W O-A-9856831 and W O-A-0034341. The contents of the above documents are incorporated herein by reference. Further metallocenes are described e.g. in EPA-260 130. As further examples of usable metallocenes may also be found e.g. from WO-A-9728170, WO-A-9846616, WO-A-9849208, WO-A-9912981, WO-A-9919335, WO-A-9856831, WO-A-00/34341, EP-A423 101 and EP-A-537 130 as well as V. C. Gibson et al., in Angew. Chem. Int. Ed., engl., Vol 38, 1999, pp 428-447, the disclosures of which are incorporated herein by reference.

Alternatively, in a further subgroup of the metallocene compounds, the metal bears a Cp group as defined above and additionally a n' or n$^2$ ligand, wherein said ligands may or may not be bridged to each other. This subgroup includes so called "scorpionate compounds" (with constrained geometry) in which the metal is complexed by a n$^5$ ligand bridged to a n' or n$^2$ ligand, preferably n' (for example a sigma-bonded) ligand, e.g. a metal complex of a Cp group as defined above, e.g. a cyclopentadienyl group, which bears, via a bridge member, an acyclic or cyclic group containing at least one heteroatom, e.g. —NR"$_2$ as defined above. Such compounds are described e.g. in WO-A-9613529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl. Another subgroup of the organotransition metal compounds of formula I usable in the present invention is known as non-metallocenes wherein the transition metal (preferably a Group 4 to 6 transition metal, suitably Ti, Zr or Hf) has a coordination ligand other than cyclopentadienyl ligand.

The term "non-metallocene" herein means compounds, which bear no cyclopentadienyl ligands or fused derivatives thereof, but one or more non-cyclopentadienyl n- or a-, mono-, bi- or multidentate ligand. Such ligands can be chosen e.g. from (a) acyclic, n'- to n$^4$- or n$^6$-ligands composed of atoms from Groups 13 to 16 of the Periodic Table (IUPAC), e.g. an acyclic pentadienyl ligand wherein the chain consists of carbon atoms and optionally one or more heteroatoms from Groups 13 to 16 (IUPAC), and in which the open chain ligand may be fused with one or two, preferably two, aromatic or non-aromatic rings and/or bear further substituents (see e.g. WO 01 70395, WO 97 10248 and WO 99 41290), or (b) cyclic a-, n'- to n$^4$- or n$^s$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99 10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02 060963). As examples of such compounds, i.a. transition metal complexes with nitrogen-based, cyclic or acyclic aliphatic or aromatic ligands, e.g. such as those described in the applicants earlier application WO-A-9910353 or in the Review of V. C. Gibson at al., in Angew. Chem. Int. Ed., engl., Vol 38, 1999, pp 428-447 or with oxygen-based ligands, such as Group 4 metal complexes bearing bidentate cyclic or acyclic aliphatic or aromatic alkoxide ligands, e.g. optionally substituted, bridged bisphenolic ligands (see i.a. the above review of Gibson et al.). Further specific examples of non-n$^s$ ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference. It should be noted that the diversity does not affect the applicability of the process of the invention, whose essential particle-shaping measures remain unaffected by the particular content of the particles to be shaped.

The preparation of metallocenes and non-metallocenes, and the organic ligands thereof, usable in the invention is well documented in the prior art, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand (ri-ligand) with a transition metal. Alternatively, a metal ion of an existing metallocene can be exchanged for another metal ion through transmetallation.

If several different transition metal compounds are used (mixed dual or multicatalyst systems), these can be any combinations of the above organometal compounds or of the above organometal compounds with other catalyst compounds (including Ziegler-Natta and chromium oxide systems)/e.g. a combination at least of two or more a metallocenes, of a metallocene and a non-metallocene, as well as of a metallocene and/or a non-metallocene with a Ziegler-Natta catalyst system (which comprises typically (see below) a transition metal compound and a compound of a metal from Group 2 of the Periodic Table, such as a Mg compound).

As stated above, the catalyst prepared according to the present invention may further comprise one or more cocatalysts well known in the art, preferably an activator containing aluminium or boron. Examples of such activators are organo aluminium compounds, such as trialkylaluminium compound and/or aluminoxane compound, or non-coordination ionic cocatalysts, such as boron activators.

Preferred as cocatalysts for metallocenes and non-metallocenes, if desired, are the aluminoxanes, in particular the C1-C10-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. In this regard mention may be made particularly to boron compounds known in the art. Said activators are commercially available or can be prepared according to the prior art literature.

Further aluminoxane cocatalysts are described i.a. in WO-A-9428034 which is incorporated herein by reference. These are linear or cyclic oligomers of having up to 40, preferably 3 to 20, —(Al(R''')O)— repeat units (wherein R''' is hydrogen, C1-C10-alkyl (preferably methyl) or C6-C18-aryl or mixtures thereof).

The use and amounts of the such activators are within the skills of an expert in the field. As an example, with the boron activators, 5:1 to 1:5, preferably 2:1 to 1:2, such as 1:1, ratio of the transition metal to boron activator may be used. In case of aluminoxanes, such as methylaluminumoxane (MAO), the amount of Al, provided by aluminoxane, can be chosen to provide an Al:transition metal molar ratio e.g. in the range of 1:1 to 10000:1, suitably 5:1 to 8000:1, preferably 10:1 to 7000:1, e.g. 100:1 to 4000:1, as normally used for homogeneous catalyst systems, or, depending on the used catalyst forming compounds, a so 10:1 to 500:1, such as 100:1 to 300:1 as normally used for heterogeneous catalyst Systems may be used.

The quantity of cocatalyst to be employed in the catalyst of the invention is thus variable, and depends on the conditions and the particular transition metal compound chosen in a manner well known to a person skilled in the art.

Further Catalyst Systems, Including Ziegler Natta (ZN) Systems

In a further embodiment of the present invention, Ziegler Natta catalysts may be employed as catalysts. These catalysts include a transition metal compound of groups 4 to 10 (preferably Ti) of the Periodic table or a compound of an actinide or lanthanide, a compound of a group 1-3 metal, preferably magnesium, and an electron donor compound. Suitable compositions and reaction conditions for forming ZN catalysts and further catalyst systems are in particular disclosed in WO 03/000754 and WO 03/000757, incorporated herein by reference.

Suitable transition metal compounds are in particular transition metal compounds of transition metals of groups 4 to 6, in particular of group 4. Suitable examples include Ti, Cu, Fe, Co, Ni, Pt, and/or Pd, but also Cr, Zr, Ta, and Th, in particular preferred is Ti. Of the compounds of groups 1 to 3 preferred are compounds of group 2 elements, in particular Mg compounds, such as Mg halides, Mg alkoxides etc. as known to the skilled person.

The electron donor compound is preferably an mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a C2-C16 alkanol and/or diol, and is preferable dioctyl phthalate.

As mentioned above catalyst systems may include in addition to the solid catalyst particles additional cocatalysts and/or external donor(s), depending on the used polymerisation process, in a manner known in the art. As the cocatalyst, e.g. conventional activators based on compounds of group 13 of the Periodic Table (IUPAC), e.g. organo aluminium, such as aluminium compounds, like aluminium alkyl, aluminium halide or aluminium alkyl halide compounds (e.g. triethylaluminium) compounds, can be mentioned. Additionally, especially in case of the (co)polymerisation of polypropylene or higher olefins, one or more external donors can be used which may be typically selected e.g. from silanes or any other well known external donors in the field.

It is also possible to include other catalyst component(s) than said ZN components to the catalyst of the invention.

The solid catalyst particles in accordance with the present invention comprise the catalytically active sites distributed throughout the catalyst matrix of the particles. In accordance with the present invention, this definition means that the catalytically active sites are evenly distributed throughout the matrix of the particles, preferably that the catalytically active sites make up a substantial portion of the matrix phase of the solid particles in accordance with the present invention. In accordance with embodiments of the present invention, this definition means that the catalytically active components, i.e. the catalyst component makes up the major part of the matrix phase of the particle. Other components, except for the above mentioned catalyst additives, such as cocatalysts, activators etc., may be included in the matrix phase, preferably, however, these other components only are present in minute amounts, such as residual solvents or residual components derived from the preparation process (exemplified below). These further components should in particular not affect the catalytical activity or the particle morphology and usually such additional components are present only in very minute amounts of clearly below 7 wt %, preferably below 5 wt %, more preferably below 3 wt % or even below 1 wt %.

The solid particles in accordance with the present invention are furthermore characterized in that they comprise inclusions not comprising catalytically active sites. Such inclusions, i.e. a dispersed phase within the matrix phase of the catalyst component (see above), usually constitute only a minor part of the total volume of the solid particles, i.e. typically below 50%, more preferably lower than 40% and, in particular 30% or lower, 20% or lower and in embodiments even 10% or lower. A suitable range as also illustrated in the examples is a range of from 8 to 30%, more preferably 10 to 25%.

The inclusions may be of any desired shape, including spherical as well as elongated shapes and irregular shapes. Inclusions in accordance with the present invention may have a plate-like shape or they may be long and narrow, for example in the shape of a fiber. Irregular shapes of all kind are also envisaged by the present invention. Typical inclusions, however, are either spherical or near spherical or they show plate-like shapes. It is to be noted that the inclusions are inside the particles, but essentially not extending to the surface of the particles.

The inclusions in accordance with the present invention, not comprising catalytically active sites, may be present in the form of hollow voids, in the form of liquid-filled hollow voids, in the form of hollow voids partially filled with liquid, in the form of solid material or in the form of hollow voids partially filled with solid material. In particular, in the case of using solid materials, the shape of the inclusions can be determined on the basis of the shape of the solid material, or particles of solid material employed. The shape of hollow voids, liquid-filled hollow voids and hollow voids partially filled with liquid are typically determined by the process conditions during the preparation of the solid particles, as further outlined in detail below.

Typical examples of solid materials suitable for forming inclusions in accordance with the present invention are inorganic materials as well as organic, in particular organic polymeric materials, suitable examples being nano materials, such as silica, montmorillonite, carbon black, graphite, zeolites, $TiO_2$ as well as other inorganic particles, including glass nanobeads or any combination thereof. Suitable organic particles, in particular polymeric organic particles, are nano beads made from polymers such as polystyrene, or other polymeric materials. In any case, the particulate materials employed for providing inclusions in the solid particles in accordance with the present invention have to be inert towards the catalytically active sites, during the preparation of the solid particles as well as during the subsequent use in polymerization reactions. The solid materials used for providing inclusions in accordance with the present invention preferably themselves have a low surface area and are more preferably non-porous.

Hollow voids, liquid-filled voids and hollow voids partially filled with liquid, in accordance with the present invention, may in particular be introduced into the solid particles in accordance with the present invention by using inert liquids, which preferably are immiscible with the liquids and solvents used during the preparation of the solid catalyst particles in accordance with the invention. These liquids furthermore may display a different viscosity, compared with the liquids employed during the catalyst particle preparation as solvents and/or reaction medium. Suitable examples thereof are silicon oils, perfluorinated hydrocarbons, such as hydrocarbons having from 6 to 20 carbon atoms, preferably 7 to 14 carbon atoms, with a particularly preferred example being perfluoro octane. Other inert and immiscible liquids may be also employed, including partially fluorinated hydrocarbons, perfluorinated ethers (including polyethers) and partially fluorinated ethers, as long as these liquids are inert towards the catalyst component and provide inclusions in accordance with the present invention.

Preferably, such liquids are employed in combination with a suitable surfactant, which stabilizes the inclusions during the preparation of the solid particles. For example, surfactants, e.g. surfactants based on hydrocarbons (including polymeric hydrocarbons with a molecular weight e.g. up to 10 000, optionally interrupted with a heteroatom(s)), preferably halogenated hydrocarbons, such as semi-, or highly-fluorinated hydrocarbons optionally having a functional group, or, preferably semi-, highly- or perfluorinated hydrocarbons having a functionalised terminal, can be used. Surfactants can also be formed by reacting a surfactant precursor bearing at least one functional group with a compound being part of the catalyst solution or solvent and being reactive with said functional group. Examples of the surfactant precursors include e.g. known surfactants which bear at least one functional group selected e.g. from —OH, —SH, —NH$_2$, —COOH, —COONH$_2$, oxides of alkenes, oxo-groups and/or any reactive derivative of these groups, e.g. semi-, highly or perfluorinated hydrocarbons bearing one or more of said functional groups.

The inclusions in accordance with the present invention typically have a size in the range of 100 nm (widest diameter), although the size is not restricted to this specific value. The present invention also contemplates inclusions having sizes of from 20 to 500 nm, with sizes of from 20 to 400, and in particular from 20 to 200 nm being preferred. In particular sizes from 30 to 100 nm are preferred. The size of the inclusions can naturally vary the size of the catalyst particles. Bigger particles can have bigger cavities than smaller particles, however, inclusions of bigger particles can also be smaller than the ones of the smaller particles. The size of the inclusions may be controlled by the size of the solid material employed for the provision of inclusions, as outlined above, in connection with the control of the shape of the inclusions. The size of hollow voids, liquid filled hollow voids and partially liquid filled hollow voids may, in particular, be controlled during the preparation of solid particles.

The catalysts in accordance with the present invention are in particular polymerisation catalysts for polymerising olefins, including ethylene, propylene, other alpha-olefins, vinyl compounds such as styrene and styrene derivatives as well as mixtures thereof. The catalyst in accordance with the present invention may be employed in any type of polymerisations, including liquid, slurry and bulk polymerisations, as well as gas phase polymerisations, and any combinations thereof. In particular the catalyst of the present invention may be employed in multistage polymerisation processes, including at least two polymerisation steps, selected from the polymerisations listed above, or a combination thereof, comprising e.g. slurry or bulk and gas phase polymerisation steps. Additional combinations are e.g. slurry—slurry, bulk—bulk and gas phase—gas phase polymerisations. One of the preferred multistage polymerisations process comprises at least one bulk and at least one gas phase polymerisation. In addition to the actual polymerisation the process can further contain any pre- or post processes, like prepolymerisation step.

The catalyst particles of the present invention furthermore provide the so called replication effect. Polymers produced with the catalysts of the present invention, like the catalyst particles, show a spherical shape with a low surface area. Like the catalyst particles the polymer particles show a particle size distribution, wherein the distribution correlates to the distribution of the catalyst particles, i.e. narrow particle size distribution of the catalyst particles provide narrow polymer particle size distributions, etc. Furthermore the morphology of the polymer particles also correlates to the particle morphology of the catalyst particles. The areas of the catalyst particles constituting the matrix phase comprising the catalytically active sites find their correlation in the product particles in areas of polymer, while the inclusions of the catalyst particles give rise to hollow voids within the product particles. The catalyst particle morphology accordingly determines the product morphology, so that desired product morphologies may already be adjusted/controlled during the preparation of the catalyst particles.

The catalyst particles in accordance with the present invention may be formed by processes employing the individual components for the catalyst and the agent for providing the inclusions. Said components may be selected of the catalyst components as outlined above, and the preferred embodiments as derivable from the above disclosure. The invention also applies concerning the method of preparing catalyst particles of the present invention.

Preferably the catalyst particles of the present invention are obtained by preparing a solution of one or more catalyst components, dispersing said solution in a solvent, so that the catalyst solution forms a dispersed phase in the continuous solvent phase, and solidifying the catalyst phase to obtain the catalyst particles of the present invention. The inclusions in accordance with the present invention may be introduced by appropriately admixing said agent for forming the inclusions with the catalyst solution, during the preparation thereof or after formation of the catalyst phase.

Suitable processes for mixing include the use of mechanical as well as the use of ultrasound for mixing, as known to the skilled person. The process parameters, such as time of mixing, type of mixing, power employed for mixing, such as mixer velocity or wavelength of ultrasound employed, viscosity of solvent phase, additives employed, such as surfactants, etc. are used for adjusting the size of the catalyst particles as well as the size, shape, amount and distribution of the inclusions within the catalyst particles.

Particularly suitable methods for preparing the catalyst particles of the present invention are outlined below.

The catalyst solution or phase may be prepared in any suitable manner, for example by reacting the various catalyst precursor compounds in a suitable solvent. In one embodiment this reaction is carried out in an aromatic solvent, preferably toluene, so that the catalyst phase is formed in situ and separates from the solvent phase. These two phases may then be separated and an agent for forming the inclusions may be added to the catalyst phase. After subjecting this mixture of catalyst phase and agent for providing the inclusions to a suitable dispersion process, for example by mechanical mixing or application of ultrasound, in order to prepare a dispersion of the inclusion providing agent in the catalyst phase, this mixture (which may be a dispersion of solid inclusion providing agent in the catalyst phase forming a microsuspension or a microemulsion of droplets of a liquid inclusion providing agent in the catalyst phase) may be added back to the solvent phase or a new solvent, immiscible with the catalyst phase mixture comprising the inclusion providing agent, in order to prepare a mixture (suitable an emulsion) of the disperse catalyst phase in the continuous solvent phase. The catalyst phase, comprising the inclusion providing agent, usually is present in this mixture in the form of small droplets, corresponding in shape and size approximately to the catalyst particles to be prepared. Said catalyst particles, comprising the inclusions may then be formed and recovered in usual manner, including heating steps (for solidifying the catalyst particles) and separating steps (for recovering the catalyst particles). In this connection reference is made to the disclosure in the international applications WO 03/000754, WO 03/000757 and WO 03/051934, disclosing suitable reaction conditions. This disclosure is incorporated herein by reference. The catalyst particles obtained may furthermore be subjected to further post-processing steps, such as washing, stabilizing, coating, prepolymerization, prior to the final use in polymerisation processes.

An alternative to the above outlined method of preparing the catalyst particles of the present invention, in particular suitable for a method employing solid inclusion providing agents, is a method wherein the inclusion providing agent is already introduced at the beginning of the process, i.e. during the step of forming the catalyst solution/catalyst phase (see example 3). Such a sequence of steps facilitates the preparation of the catalyst particles since the catalyst phase, after formation, has not to be separated from the solvent phase for admixture with the inclusion providing agent.

Suitable method conditions for the preparation of catalyst phase, admixture with the solvent phase, suitable additives therefore etc. are disclosed in the three above mentioned international applications, WO 03/000754, WO 03/000757 and WO 03/051934, incorporated herein by reference.

As is derivable from the above and the following examples, the present invention allows the preparation of novel catalyst particles comprising inclusions. The size, shape, amount and distribution thereof within the catalyst particles may be controlled by the agents for providing inclusions employed and the process conditions, in particular the above outlined mixing conditions.

The following examples illustrate the invention.

EXAMPLES

Emulsion in Emulsion System for Preparation of Catalyst Particles with Inclusions Preparation of the Soluble Mg-Complex A magnesium complex solution was prepared by adding, with stirring, 55.8 kg of a 20% solution in toluene of BOMAG A, tradename for $(Mg(Bu)_{1.5}(Oct)o_{0.5}$, to 19.4 kg 2-ethylhexanol in a 150 l steel reactor. During the addition the reactor contents were maintained below 20° C. The temperature of the reaction mixture was then raised to 60° C. and held at that level for 30 minutes with stirring, at which time reaction was complete. 5.5 kg 1,2-phthaloyl dichloride was then added and stirring of the reaction mixture at 60° C. was continued for another 30 minutes. After cooling to room temperature a yellow solution was obtained.

Example 1

Preparation of the Catalyst 19.5 ml titanium tetrachloride was placed in a 300 ml glass reactor equipped with a mechanical stirrer. Mixing speed was adjusted to 170 rpm, and 32.0 g Mg-complex was slowly added over a period of 10 minutes. During the addition of the Mg-complex the reactor temperature was kept below 30° C.

A solution of 3.0 mg polydecene in 1.0 ml toluene and 2.0 ml Viscoplex 1-254 (tradename for methacrylate concentrate in a base oil) were then added to the reaction mixture at room temperature. After 5 minutes stirring at room temperature 10.0 ml of heptane was added, and stirring was continued for an additional 15 minutes.

Mixing was stopped, and after a few minutes a liquid/liquid two-phase system was obtained. The upper phase of this two-phase system ($TiCl_4$/toluene phase) was carefully transferred into a second reactor, and 2.0 ml of perfluoro octane was added to the remaining lower phase under vigorous stirring (500 rpm). A mixture of 0.17 g 3-perfluorooctyl-1,2-propenoxide and 38.3 mg magnesium bis(2-ethyl hexoxide) in 0.2 ml toluene was then added to the reaction mixture. Mixing at 500 rpm was continued for 5 minutes, followed by sonification of the mixture in an ultrasound washing bath for an additional 2 minutes. Mixing speed was then decreased to 170 rpm, and the TiCl4/toluene phase was added from the storage reactor to the reaction mixture as fast as possible, and mixing at room temperature was continued for 5 minutes at 170 rpm.

The temperature of the reaction mixture was then slowly raised to 90° C. over a period of 20 minutes and held at that level for 30 minutes with stirring.

After settling and syphoning the solids underwent washing with 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

Example 2

Preparation of the Catalyst 19.5 ml titanium tetrachloride was placed in a 300 ml glass reactor equipped with a mechanical stirrer. Mixing speed was adjusted to 170 rpm, and 32.0 g Mg-complex was slowly added over a period of 10 minutes. During the addition of the Mg-complex the reactor temperature was kept below 30° C.

A solution of 3.0 mg polydecene in 1.0 ml toluene and 2.0 ml Viscoplex 1-254 were then added to the reaction mixture at room temperature. After 5 minutes stirring at room temperature 10.0 ml of n-heptane was added, and stirring was continued for an additional 15 minutes.

Mixing was stopped, and after a few minutes a liquid/liquid two-phase system was obtained. The upper phase of this two-phase system ($TiCl_4$/toluene phase) was carefully transferred into a second reactor, and 2.0 ml of perfluoro octane was added to the remaining lower phase under vigorous stirring (500 rpm). A mixture of 0.17 g 3-perfluorooctyl-1,2-propenoxide and 38.3 mg magnesium bis(2-ethyl hexoxide) in 0.2 ml toluene was then added to the reaction mixture. Mixing at 500 rpm was continued for 5 minutes, followed by sonification of the mixture in an ultrasound washing bath for an additional 2 minutes. Mixing speed was then decreased to 150 rpm, and the TiCl4/toluene phase was added from the storage reactor to the reaction mixture as fast as possible.

A solution of 3.0 mg polydecene in 1.0 ml of toluene was added, and mixing at room temperature was continued for 5 minutes at 150 rpm.

The temperature of the reaction mixture was then slowly raised to 90° C. over a period of 20 minutes and held at that level for 30 minutes with stirring.

After settling and syphoning the solids underwent washing with 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

Example 3

Preparation of the Catalyst (with Nanoparticles)

19.5 ml titanium tetrachloride was placed in a 300 ml glass reactor equipped with a mechanical stirrer. 150 mg of EXM 697-2 (magnesium-aluminum-hydroxy-carbonate from Sud-Chemie AG) were added thereto. Then 10.0 ml of n-heptane was added. Mixing speed was adjusted to 170 rpm, and 32.0 g Mg-complex was slowly added over a period of 2 minutes. During the addition of the Mg-complex the reactor temperature was kept below 30° C.

A solution of 3.0 mg polydecene in 1.0 ml toluene and 2.0 ml Viscoplex 1-254 were then added to the reaction mixture at room temperature. After 10 minutes stirring, the temperature of the reaction mixture was slowly raised to 90° C. over a period of 20 minutes and held at that level for 30 minutes with stirring.

After settling and syphoning the solids underwent washing with 100 ml toluene at 90° C. for 30 minutes, twice with 60 ml heptane for 10 minutes at 90° C. and twice with 60 ml pentane for 2 minutes at 25° C. Finally, the solids were dried at 60° C. by nitrogen purge. From the catalyst 13.8% of magnesium, 3.0% titanium and 20.2% di(2-ethylhexyl)phthalate (DOP) was analysed.

Comparative Example

Preparation of the Catalyst 19.5 ml titanium tetrachloride was placed in a 300 ml glass reactor equipped with a mechanical stirrer. Mixing speed was adjusted to 170 rpm, and 32.0 g Mg-complex was slowly added over a period of 10 minutes. During the addition of the Mg-complex the reactor temperature was kept below 30° C.

A solution of 3.0 mg polydecene in 1.0 ml toluene and 2.0 ml Viscoplex 1-254 were then added to the reaction mixture at room temperature. After 5 minutes stirring at room temperature 10.0 ml of n-heptane was added, and stirring was continued for an additional 30 minutes.

The temperature of the reaction mixture was then slowly raised to 90° C. over a period of 20 minutes and held at that level for 30 minutes with stirring.

After settling and syphoning the solids underwent washing with 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

Bulk Polymerisation of Propylene

The propylene bulk polymerisation was carried out in a stirred 5 l tank reactor. About 0.9 ml triethyl aluminium (TEA) as a co-catalyst, ca 0.12 ml cyclohexyl methyl dimethoxy silane (CMMS) as an external donor and 30 ml n-pentane were mixed and allowed to react for 5 minutes. Half of the mixture was then added to the polymerisation reactor and the other half was mixed with about 20 mg of a catalyst. After additional 5 minutes the catalyst/TEA/donor/n-pentane mixture was added to the reactor. The Al/Ti mole ratio was 250 mol/mol and the Al/CMMS mole ratio was 10 mol/mol. 70 mmol hydrogen and 1400 g propylene were introduced into the reactor and the temperature was raised within ca 15 minutes to the polymerisation temperature (70 or 80° C., see also table 2). The polymerisation time after reaching polymerisation temperature was 60 minutes, after which the polymer formed was taken out from the reactor.

The cavities found from cross cutting of the polymer particles obtained with catalysts in accordance with the present invention were very long and narrow holes.

The examples are summarized in the following tables.

Measuring Methods:

Particle size distribution PSD: measured with Coulter LS200 at room temperature with n-heptane as medium Bulk density BD: is measured by ASTM D 1895

$MFR_2$: ISO 1133, 230 C.°, with 2.16 kg load

Xylene solubles XS:

2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

$$XS\% = (100 \times m_1 \times vo)/(mo \times v_1)$$

mo=initial polymer amount (g)

$m_1$=weight of residue (g)

vo=initial volume (ml)

$v_1$ volume of analysed sample (ml)

TABLE 1

| Catalyst | PFO [ml] | Polydecene [ml] 1. Emulsion | Polydecene [ml] 2. Emulsion | Mixing [rpm] 2. Emulsion | Polymerisation Activity [kg PP/g] | Polymer PS [urn] | Polymer PSD | Polymer BD [g/ml] |
|---|---|---|---|---|---|---|---|---|
| Ex 1 | 2.0 | 1.0 | — | 170 | 39.8 | 106 | broad | 0.41 |
| Ex 2 | 2.0 | 1.0 | 1.0 | 150 | 41.0 | 42 | narrow | 0.45 |
| Ex 3 | — | — | — | — | 27.4 | — | broad | 0.40 |
| Comparative | — | — | — | — | 30.1 | — | narrow | 0.51 |

*) EXM697-2 (magnesium-aluminum-hydroxy-carbonate nanoparticles)

TABLE 2

| | Elemental composition of catalyst | | | Polymer | |
|---|---|---|---|---|---|
| | Ti [wt %] | Mg [wt %] | DOP [wt %] | MFR [g/10 min] | XS [wt-%] |
| Ex 1 | 3.20 | 13.8 | 28.9 | 5.4 | 1.3 |
| Ex 2 | 3.50 | 13.0 | 27.7 | 3.8 | 1.4 |
| Ex 3 | 3.04 | 13.8 | 20.2 | 5.9 | 2.1 |
| Comp. | 2.96 | 13.72 | 25.3 | 4.7 | 2.0 |

TABLE 3

| | Polymer sieving [wt %] | | | | | | | |
|---|---|---|---|---|---|---|---|---|
| | Bottom | 0.056 mm | 0.1 mm | 0.18 mm | 0.5 mm | 1 mm | 2 mm | 4 mm |
| Ex 1 | 0 | 0.1 | 0.2 | 4.4 | 9.7 | 17.1 | 36.5 | 32.2 |
| Ex 2 | 0 | 0 | 0.1 | 4.1 | 22.6 | 62.6 | 10.3 | 0.1 |
| EX 3 | 0 | 0 | 0 | 1.5 | 7.4 | 51.3 | 37.3 | 2.3 |
| Comp. | 0 | 0.1 | 0.3 | 27.6 | 63.1 | 8.6 | 0.4 | 0.1 |

TABLE 4

| Catalyst | Activity [kg PP/g] | PS [urn] | PSD | BD [g/ml] |
|---|---|---|---|---|
| Example 1* | 39.8 | 106 | Broad | 0.41 |
| Example 2* | 41.0 | 42 | Narrow | 0.45 |
| Example 3** | 27.4 | — | Broad | 0.40 |
| Reference | 30.1 | 21 | Narrow | 0.51 |

*Perfluoro octane emulsion in emulsion
**EXM697-2 (magnesium-aluminum-hydroxy-carbonate nanoparticles)

Volume fraction of voids/polymer particle: $V_{void}/V_{particle} \sim (BD_{reference} - BD)/BD_{reference}$ wherein BD designates the bulk density of a sample of polymer particles produced in accordance with the present invention and $BD_{reference}$ designates the bulk density of a reference product produced under similar conditions with catalyst particles not comprising the inclusions as the catalyst particles of the present invention.

TABLE 5

| | Catalyst | | | | Polymer | | | | | |
|---|---|---|---|---|---|---|---|---|---|---|
| Catalyst | Ti [wt-%] | Mg [wt-%] | DOP [wt-%] | Activity [kg PP/g] | MFR (g/10 min) | XS [wt-] | BD [g/ml] | BD(0.5) [g/ml] | BD(1) [g/ml] | BD(0.5-1) [g/ml] |
| Ex 1* | 3.20 | 13.8 | 28.9 | 39.8 | 5.4 | 1.3 | 0.41 | 0.40 | 0.38 | 0.39 |
| Ex 2* | 3.50 | 13.0 | 27.7 | 41.0 | 3.8 | 1.4 | 0.45 | 0.46 | 0.43 | 0.44 |
| Ex 3** | 3.04 | 13.8 | 20.2 | 27.4 | 5.9 | 2.1 | 0.40 | 0.39 | 0.37 | 0.39 |
| Comp. | 2.96 | 13.72 | 25.3 | 30.1 | 4.7 | 2.0 | 0.51 | 0.51 | 0.49 | 0.51 |

[1]) ISO 1133, 2.16 kg load at 230° C.
[2]) Xylene-soluble fraction of product at 25° C.
*Perfluoro octane emulsion in emulsion
**Nano particles in Emulsion (EXM697-2; magnesium-aluminum-hydroxy-carbonate nanoparticles)
BD(0.5): Bulk density of polymer powder with particle size between 0.5 and 1.0 mm
BD(1): Bulk density of polymer powder with particle size between 1.0 and 2.0 mm
BD(0.5-1): Bulk density of polymer powder with particle size between 0.5 and 2 mm The volume fraction of the polymer particles may be calculated using the following correlation The examples shown above clearly show the desired effect of the present invention, i.e. the replica effect with respect to the particle size distribution as well as with respect to particle morphology.

The invention claimed is:

1. Polymerization catalyst comprising solid catalyst particles, said particles having a spherical shape and a surface area of less than 20 m²/g, wherein the particles comprise a catalyst matrix, wherein catalytically active sites are distributed throughout the catalyst matrix, and wherein said particles further comprise inclusions not comprising catalytically active sites, wherein the inclusions have sizes of from 20 to 500 nm.

2. Catalyst in accordance with claim 1, wherein the surface area of the particles is less than 10 m²/g.

3. Catalyst in accordance with claim 1, wherein the inclusions not comprising the catalytically active sites are constituted by any one of the following or any combination thereof:
   a) hollow voids;
   b) liquid filled hollow voids;
   c) hollow voids partially filled with liquid;
   d) solid material;
   e) voids partially filled with solid material.

4. Catalyst in accordance with claim 3, wherein the solid material is selected from inorganic materials and organic polymeric materials.

5. Catalyst in accordance with claim 1, wherein the catalyst is formed by contacting (a) at least one compound of groups 1 to 3 of the periodic table with (b) at least one compound selected from a transition metal compound of groups 4 to 10 of the periodic table, or a compound of an actinide or lanthanide to form a reaction product.

6. Catalyst in accordance with claim 1, wherein the catalyst is a catalyst for olefin polymerization.

7. Catalyst in accordance with claim 1, wherein the catalyst is a Ziegler-Natta catalyst.

8. Catalyst in accordance with claim 1, wherein the catalyst particles comprise from 8 to 30% of said inclusions, based on the total volume of the catalyst particles.

9. Catalyst in accordance with claim 1, obtained by a process comprising the steps of:
   contacting at least one compound of groups 1 to 3 of the periodic table with at least one compound selected from a transition metal compound of groups 4 to 10 of the periodic table or a compound of an actinide or lanthanide to form a reaction product in the presence of a solvent, leading to the formation of a liquid/liquid two-phase system comprising a catalyst phase and a solvent phase,
   separating the two phases and adding an agent for generating said inclusions not comprising catalytically active sites to the catalyst phase,
   forming a finely dispersed mixture of said agent and said catalyst phase,
      adding the solvent phase to the finely dispersed mixture,
      forming an emulsion of the finely dispersed mixture in the solvent phase, wherein the solvent phase represents the continuous phase and the finely dispersed mixture forms the dispersed phase, and
      solidifying the dispersed phase.

10. Catalyst in accordance with claim 1, obtainable by a process comprising the steps of:
   contacting, in the presence of an agent for generating said inclusions not comprising catalytically active sites to the catalyst phase, at least one compound of groups 1 to 3 of the periodic table with at least one compound selected from a transition metal compound of groups 4 to 10 of the periodic table or a compound of an actinide or lanthanide to form a reaction product in the presence of a solvent, leading to the formation of a liquid/liquid two-phase system comprising a catalyst phase and a solvent phase,
   forming an emulsion comprising a catalyst phase comprising said agent and a solvent phase, wherein the solvent phase represents the continuous phase and the catalyst phase forms the dispersed phase, and
   solidifying the dispersed phase.

11. Catalyst system comprising a catalyst, at least one cocatalyst and/or at least one external donor and/or, optionally, at least one activator, wherein the catalyst is a catalyst in accordance with claim 1.

12. A method of preparing a polymerization catalyst, comprising the steps of:
   contacting, in the presence of an agent for generating inclusions not comprising catalytically active sites in particles of the polymerization catalyst, wherein the agent is a perfluorinated hydrocarbon liquid, and optionally a surfactant, at least one compound of groups 1 to 3 of the periodic table with at least one compound selected from a transition metal compound of groups 4 to 10 of the periodic table or a compound of an actinide or lanthanide to form a reaction product in the presence of a solvent, leading to the formation of a liquid/liquid two-phase system comprising a catalyst phase and a solvent phase,
   forming an emulsion comprising the catalyst phase in the form of droplets comprising said agent and a solvent phase, wherein the solvent phase represents the continuous phase and the catalyst phase forms the dispersed phase, and
   solidifying the dispersed phase.

13. A method of preparing a polymerization catalyst, comprising the following steps:
   contacting at least one compound of groups 1 to 3 of the periodic table with at least one compound selected from a transition metal compound of groups 4 to 10 of the periodic table or a compound of an actinide or lanthanide to form a reaction product in the presence of a solvent, leading to the formation of a liquid/liquid two-phase system comprising a catalyst phase and a solvent phase,
   separating the two phases and adding an agent for generating inclusions not comprising catalytically active sites in particles of the polymerization catalyst, wherein the agent is a perfluorinated hydrocarbon liquid and optionally, a surfactant,
   forming a finely dispersed mixture of said agent and said catalyst phase,
   adding the solvent phase to the finely dispersed mixture,
   forming an emulsion of the finely dispersed mixture in the solvent phase, wherein the solvent phase represents the continuous phase and the finely dispersed mixture forms the dispersed phase, and
   solidifying the dispersed phase.

14. Method in accordance with claim 12 or 13, wherein the presence of said agent in said catalyst phase results in the formation of a micro-emulsion.

15. Method in accordance with claim 12 or 13, wherein the catalyst is a Ziegler-Natta catalyst.

16. Polymerization method, comprising polymerizing an olefin in the presence of catalyst particles in accordance with claim 1.

17. Method in accordance with claim 12, wherein the amount and/or shape and/or size of the inclusions not comprising the catalytically active sites in particles of the polymerization catalyst is controlled by, in the contacting step, mixing in the presence of a surfactant, and said measures for controlling the amount and/or size and/or shape of said inclusions not comprising catalytically active sites are selected from one or more of:

i) the amount of surfactant employed in the contacting step;
ii) the type of surfactant employed in the contacting step; and
iii) the mixing conditions of said mixing in the contacting step.

* * * * *